US005822441A

United States Patent [19]

DeHaeze

[11] Patent Number: 5,822,441

[45] Date of Patent: Oct. 13, 1998

[54] POWER AMPLIFIER/LOUDSPEAKER INTERFACE

[76] Inventor: Jean-Marie DeHaeze, 3, Boulevard de la Republique, F-92370 Chaville, France

[21] Appl. No.: 652,538

[22] PCT Filed: Nov. 30, 1994

[86] PCT No.: PCT/FR94/01393

§ 371 Date: Jun. 3, 1996

§ 102(e) Date: Jun. 3, 1996

[87] PCT Pub. No.: WO95/15667

PCT Pub. Date: Jun. 8, 1995

[30] Foreign Application Priority Data

Dec. 1, 1993 [FR] France .................................. 93 14369

[51] Int. Cl.[6] .................................................... H04B 15/00

[52] U.S. Cl. ............................................ 381/94.6; 381/77

[58] Field of Search ................................ 381/99, 98, 77, 381/94, 94.1, 94.6; 330/306, 302

[56] References Cited

U.S. PATENT DOCUMENTS 4,031,318 6/1977 Pitre .
4,100,380 7/1978 Gosswiller .
4,229,619 10/1980 Takahashi et al. .

FOREIGN PATENT DOCUMENTS 0 485 010 5/1992 European Pat. Off. .
2182631 12/1973 France .

OTHER PUBLICATIONS

Tremaine, Howard. "Audio Cyclopedia", Howard W. Sams & Co., Inc., pp. 1575–1578, Jan. 1979.

*Primary Examiner*—Vivian Chang
*Attorney, Agent, or Firm*—Young & Thompson

[57] ABSTRACT

A method for supplying power to a hi-fi loudspeaker unit comprising a speaker (Hp) supplied via a conductor (LA) connected to a positive pole of an amplifier, and a conductor (LR) connected to a negative pole thereof , and at least one filter mounted in parallel. According to the method, the filter (s) (Z1, Z2, Z3) is (are) connected to the negative pole of the amplifier via a conductor (L1, L2, L3) which is separate from the conductor (LR) connecting the speaker (Hp) to the negative pole.

3 Claims, 2 Drawing Sheets

POWER AMPLIFIER/LOUDSPEAKER INTERFACE

BACKGROUND OF THE INVENTION

1. Field of the Invention

The present invention relates to an improvement in the power amplifier/loudspeaker interface.

2. Description of the Prior Art

High fidelity loudspeakers comprise in general several channels to which are dedicated a certain frequency band to be reproduced. To do this, it is necessary to provide in the supply circuit of the loudspeaker, filters constituted by capacitances, inductances and resistances. Certain loudspeakers comprise only filtering components in series. Most of them, requiring a more complicated filtering, have them also in parallel. The diagram of Figure la shows such a filter on one channel of a multichannel speaker; this known mounting comprises a speaker Hp supplied by a circuit comprising two conductors 1 and 2, the conductor 1 being connected to the positive pole of the amplifier by means of the conductor LA and the conductor 2 to the negative pole by the conductor LR.

As is known, the conductor 1 comprises one or several filters F disposed upstream of the speaker Hp and, between the conductors 1 and 2, one or several filters Z such as Z1, Z2, Z3.

These filters are disposed in parallel such that they shunt the speaker Hp. The connection of these filters to the terminal E− of the loudspeaker is effected by the conductor 2.

A known variant of this wiring arrangement is shown in FIG. 1*b*.

It will be noted, and this is essential, that the different manners of wiring the loudspeakers all have this in common: the return from the terminal A of the amplifier is effected by one and only one common terminal E− of the loudspeaker, via a single conductor LR.

In the case of multi-amplifiers, there are as many terminals E+ and E− and of connection conductors LA and LR as of channels, but each channel is wired and connected to the amplifier or amplifiers according to a diagram of the type 1*a* or 1*b*.

SUMMARY OF THE INVENTION

It is an object of the present invention to provide a process for providing a high fidelity speaker comprising a speaker supplied by a first conductor connected to the positive pole of an amplifier and a second conductor connected to the negative pole and at least one passive filter mounted in parallel. The process includes the step of connecting the passive filter or filters to the negative pole of the amplifier by a return conductor or conductors independent of the second conductor connecting the speaker to the negative pole.

It is a further object of the present invention to provide a process for providing the aforementioned loudspeaker using as many return conductors as passive filters in parallel.

It is another object of the present invention to provide such a process for grouping certain passive filters on the return conductor or conductors.

DESCRIPTION OF THE PREFERRED EMBODIMENTS

Figure 1A:
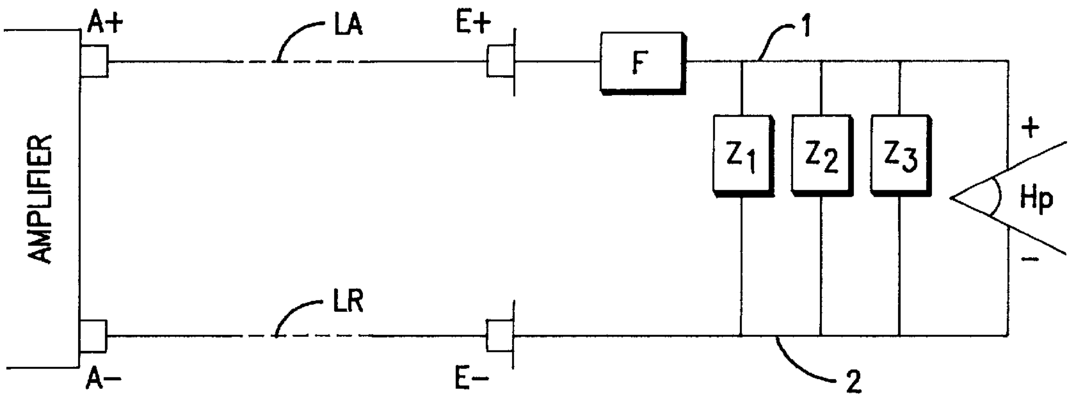
FIG. 1A PRIOR ART
FIG. 1*a* is a schematic of a conventional multichannel speaker.
Figure 1B:
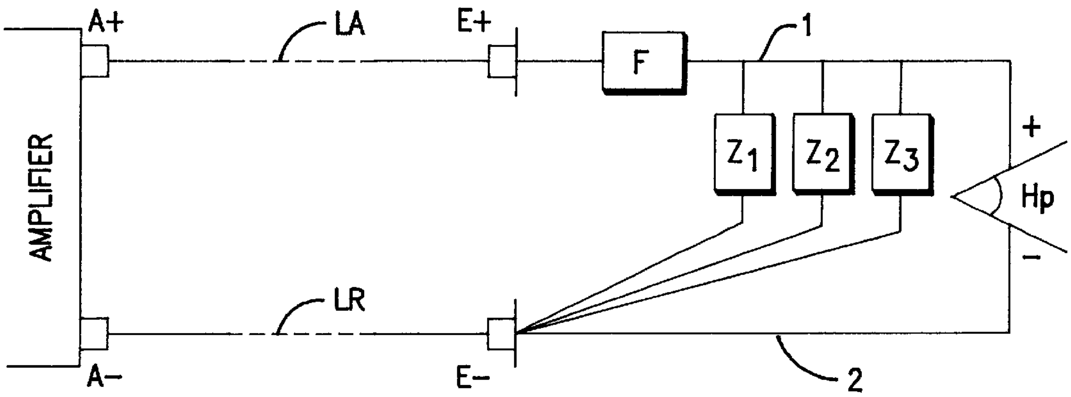
FIG. 1B PRIOR ART
FIG. 1*b* is a schematic of another conventional multichannel speaker.
Figure 2:
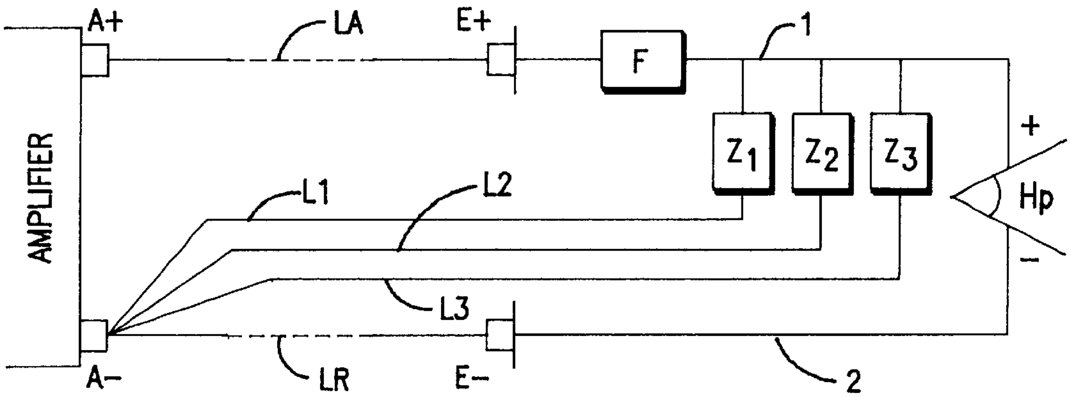
FIG. 2 is a schematic of one embodiment of the present invention.

The applicant has discovered that if, instead of connecting the elements Z1, Z2, Z3 in parallel to the single terminal E−, as is known and shown in FIGS. 1*a* and 1*b*, they are separately connected to the terminal A− of the amplifier by independent conductors L1, L2, L3, there is obtained a substantial improvement of the sound quality, as is shown in FIG. 2.

Thus, several professional musicians were listened to, principally violinists and cellists, whose recordings display their instruments, by using either a pair of loudspeakers mounted according to the diagram of FIG. 1*a* or 1*b*, or a pair of loudspeakers mounted according to the diagram of FIG. 2, the test being conducted blind, which is to say without knowing which was the pair of loudspeakers used. Each time, the difference was quickly and unambiguously noted.

The sounds produced by the loudspeakers modified by the present invention are all quite superior to those with conventional loudspeakers: the dynamic is substantially improved, the sound is more natural and rich, the timbre of the instruments is quite realistic.

More subjectively, it has been noted that the "play" of the artist was more apparent and that the emotion became more palpable.

In the contrary case, the sound was flatter, less rich with a very substantial loss of detail, giving rise to loss of credibility of the illusion of the presence of the musicians in the auditorium Other tests were carried out with an audience of high fidelity fans, and in 95% of the cases, the listeners considered that there was a substantial improvement of the sound.

This result was surprising and even contrary to the teachings of the art, because for one skilled in the art, it would appear that the electrical mounting is the same because all of the conductors L1, L2, L3 are joined at the negative pole of the amplifier. It would seem therefore that for inexplicable reasons not at all obvious, the fact that the return of the filters shunt is effected separately for each filter and separately from the return LR of the circuit of the speaker Hp produces a substantial improvement of the sound quality.

In the example of FIG. 2, there are shown three filters Z1, Z2, Z3 each having its own independent conductor L1, L2, L3 but various modifications are possible.

Thus there could be only a single filter Z: in this case, there is but one conductor L independent of the conductor LR.

There could be two filters Z1 and Z2: in this case, two solutions are possible: there could be two conductors L1 and L2 or again a single conductor L for the two filters. It will be seen that in this case that if there is an improvement of the sound, it is less substantial than if each filter has its own conductor L.

Figure 2A:
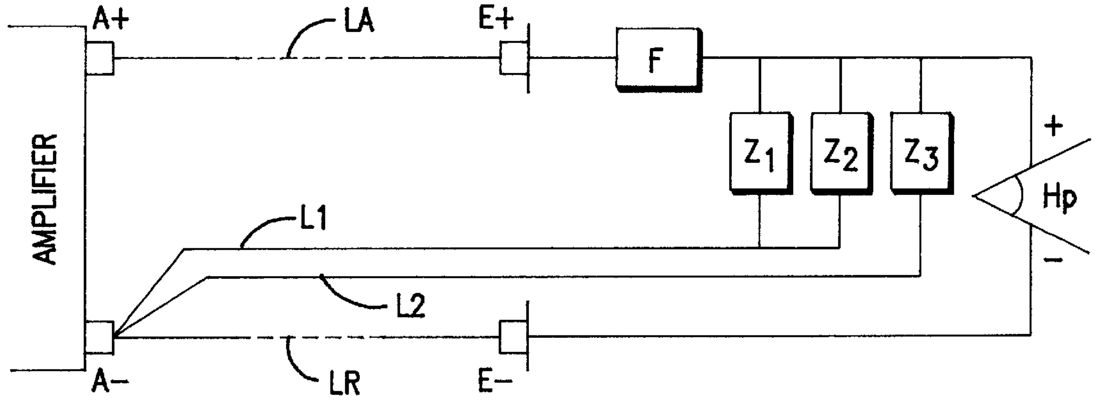
FIG. 2*a* is a schematic of a second embodiment of the present invention.
Figure 2B:
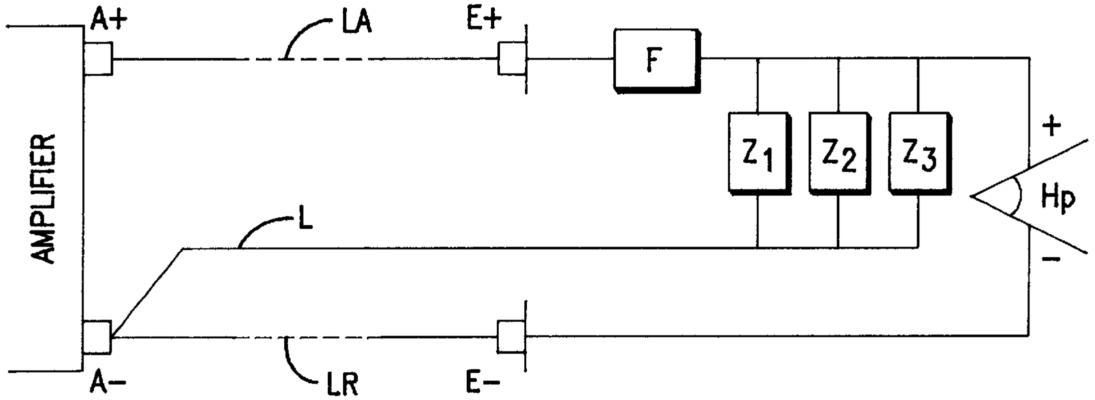
FIG. 2*b* is a schematic of a third embodiment of the present invention.

The same modifications are possible if there are three filters or more: there could be an independent conductor L for each filter or there could be grouping, as shown in FIGS. 2*a* and 2*b* . But it will be seen that the best sound is obtained when each filter has an independent conductor, which nicely illustrates the existence of a particular result.

Another test was conducted to reduce to the minimum the distance separating the loudspeaker from the amplifier.

It is evidently not desirable to arrange the loudspeakers on opposite sides of the amplifier and several centimeters from this latter. In this case, the stereophonic effect that is sought is greatly lost as to the sound quality.

Nevertheless, the applicant has tried mounting simulating a very small distance (several centimeters) between the amplifier and the loudspeakers. Thus, upon separating the filtering assembly from the loudspeaker and connecting it directly to the amplifier by a conductor that is as short as possible (several centimeters), the desired experiment is carried out. In this case, the speakers Hp remain in place whilst the length of the conductors LR and L is reduced to several centimeters.

This experiment has shown that even in the extreme case, the wiring of FIG. 2 still gives results superior to those obtained in the case of FIGS. 1*a* or 1*b*. The differences of quality of reproduction are still of the same order and evident in the course of blind listening.

One would have thought that the improvement would decrease proportionally to the reduction of the length LR and become imperceptible for very short lengths. But this is not the case. It even appears that the improvement provided by this new connection mode will be substantially independent of the amplifier/loudspeaker distance.

I claim:

1. Process for supplying power to a high fidelity speaker for domestic use comprising a speaker (Hp) supplied by a first conductor (LA) connected to the positive pole of an amplifier and a second conductor (LR) connected to the negative pole and at least one passive filter (Z) mounted in parallel to the speaker, the process including the step of connecting the at least one passive filter (Z, Z1, Z2, Z3) to the negative pole of the amplifier by at least one return conductor (L, L1, L2, L3) independent of the second conductor (LR) connecting the speaker (Hp) to said negative pole.

2. Process for supplying power to the speaker according to claim 1, further comprising the step of using an equal number of the at least one return conductor (L, L1, L2, . . . ) as the at least one passive filter in parallel (Z, Z1, Z2, . . . ).

3. Process for supplying power to the speaker according to claim 1, further comprising the step of grouping certain passive filters (Z, Z1, Z2, . . . ) on the return conductor or conductors (L, L1, L2, . . . ).

* * * * *